US012012797B2

(12) United States Patent
Mocnik et al.

(10) Patent No.: US 12,012,797 B2

(45) Date of Patent: Jun. 18, 2024

(54) SAFETY DEVICE FOR A LIFTING GATE AND LIFTING GATE WITH SUCH A SAFETY DEVICE

(71) Applicant: Efaflex Inzeniring d.o.o. Ljubljana, Ljubljana (SI)

(72) Inventors: Borut Mocnik, Zabnica (SI); Alen Ljoki, Ljubljana (SI)

(73) Assignee: Efaflex Inzeniring d.o.o. Ljubljana, Ljubljana (SI)

( * ) Notice: Subject to any disclaimer, the term of this patent is extended or adjusted under 35 U.S.C. 154(b) by 110 days.

(21) Appl. No.: 17/996,254

(22) PCT Filed: Jan. 28, 2021

(86) PCT No.: PCT/EP2021/051948

§ 371 (c)(1),
(2) Date: Oct. 14, 2022

(87) PCT Pub. No.: WO2021/209177

PCT Pub. Date: Oct. 21, 2021

(65) Prior Publication Data

US 2023/0212898 A1 Jul. 6, 2023

(30) Foreign Application Priority Data

Apr. 17, 2020 (DE) ......................... 102020110503.7

(51) Int. Cl.
*E05F 15/43* (2015.01)

(52) U.S. Cl.
CPC ........ *E05F 15/43* (2015.01); *E05F 2015/435* (2015.01); *E05Y 2201/64* (2013.01); (Continued)

(58) Field of Classification Search
CPC ................ E05F 15/43; E05F 2015/435; E05Y 2201/64; E05Y 2201/684; E05Y 2400/44
See application file for complete search history.

(56) References Cited

U.S. PATENT DOCUMENTS 6,082,046 A 7/2000 Simmons
10,605,001 B2 * 3/2020 Bartole .................. E05F 15/43
2004/0088922 A1 5/2004 Miller et al.

FOREIGN PATENT DOCUMENTS

DE 19744642 4/1999
EP 0875655 11/1998
WO 8802804 4/1988

OTHER PUBLICATIONS

Mocnik et al., Safety Device for a Lifting Gate and Lifting Gate With Such a Safety Device, Patent Cooperation Treaty Application Serial No. PCT/EP2021/051948, filed Jan. 28, 2021, International Preliminary Report on Patentability dated Oct. 27, 2022.

(Continued)

*Primary Examiner* — Georgia Y Epps
*Assistant Examiner* — Don J Williams
(74) *Attorney, Agent, or Firm* — Schmeiser, Olsen & Watts LLP

(57) ABSTRACT

The invention relates to a safety device for a lifting gate, in particular for a fast-running lifting gate having a gate leaf movable up and down and guided along both lateral gate opening edges in frames, a free leading edge of the gate leaf being assigned, at a distance (D) below the leading edge, to a photoelectric barrier (LS) which travels with the movement of the gate leaf, wherein the distance (D) can be reduced in a lower end region of a travel path of the gate leaf, and wherein at least a transmitting and/or a receiving unit and/or an opposite reflector unit of the photoelectric barrier (LS) is guided and/or arranged within a frame body of the frames.

22 Claims, 5 Drawing Sheets

(52) U.S. Cl.
CPC ..... *E05Y 2201/684* (2013.01); *E05Y 2400/44* (2013.01); *E05Y 2900/106* (2013.01)

(56) References Cited

OTHER PUBLICATIONS

Mocnik et al., Safety Device for a Lifting Gate and Lifting Gate With Such a Safety Device, Patent Cooperation Treaty Application Serial No. PCT/EP2021/051948, filed Jan. 28, 2021, International Search Report dated May 11, 2021.

Mocnik et al., Hsafety Device for a Lifting Gate and Lifting Gate With Such a Safety Device, German Patent Application Serial No. DE102020110503.7, filed Apr. 17, 2020 Examination Report dated Feb. 8, 2021.

* cited by examiner

SAFETY DEVICE FOR A LIFTING GATE AND LIFTING GATE WITH SUCH A SAFETY DEVICE

BACKGROUND OF THE INVENTION

The invention relates to a safety device for a lifting gate and a lifting gate with such a safety device. In particular, the invention relates to the above-mentioned devices in relation to fast-running lifting gates with lifting and lowering speeds of a gate leaf greater than 2.5 m/s.

In a lifting gate having a gate leaf, e.g. a windable gate curtain or a sectional gate leaf constructed from sections, it is known to arrange a lever mechanism which has at least one carrier that supports photoelectric barrier components and arranges these below its leading edge when the gate leaf is partially open, in a region of a free lower edge (leading edge) of the gate leaf. Such lever mechanisms can be retracted and extended by springs, or other elastic elements, or loaded only by their own weight, and are angled, rotated away, or displaced in the opposite direction of the gate movement when they touch down on the floor, so that the gate leaf can close completely. The positioning of the photoelectric barrier components on both sides of the gate opening is done by spring force/weight of the lever mechanism or its individual parts, so that it is not always ensured, for example in the case of unintentional soiling, that both lever mechanisms of opposite photoelectric barrier components reliably move into their extended position when the gate leaf closes.

Moreover, it is disadvantageous that some such lever mechanisms are located inside the gate opening.

SUMMARY OF THE INVENTION

It is the object of the invention to specify a safety device for a lifting gate, in particular a high-speed lifting gate, in which the functionality of safety devices and/or a positioning of photoelectric barrier components in their target position is reliably ensured during operation of the gate.

Furthermore, it is the object of the invention to ensure that a possible failure of a photoelectric barrier component or a component of an actuating mechanism of the photoelectric barriers (e.g. breakage, bending or the like) is reliably detected so that a system controller can reliably detect the failure of a safety system (photoelectric barrier).

Furthermore, components of the safety device should not form an interfering contour within the gate opening.

Furthermore, a reduced sensitivity of the safety device to external disturbances shall be ensured.

A further object of the invention is to provide a lifting gate which avoids the above disadvantages of the prior art.

These objects are solved with a safety device having the features of claim 1. Advantageous embodiments are given in subclaims 2 to 22. Furthermore, these objects are solved by a lifting gate with the features of claim 24.

The present invention relates to a safety device for a lifting gate, in particular for a fast-running lifting gate having a gate leaf movable up and down and guided along both lateral gate opening edges, wherein a free leading edge of the gate leaf is assigned, at a distance D below the leading edge, to a photoelectric barrier which travels with the movement of the gate leaf, wherein the distance D can be reduced in a lower end region of a travel path of the gate leaf, wherein at least one transmitting unit and/or a receiving unit corresponding thereto and/or a transmitting/receiving unit and/or a reflector unit corresponding thereto of the photoelectric barrier can be moved in a positively guided manner towards the leading edge and away from the leading edge within the lower end region, so that the distance D can be reduced and increased in a positively guided manner and, in particular, cannot be changed in a positively guided manner outside the end region.

The present invention succeeds in assigning the photoelectric barrier components to each other in a defined manner, independently of spring forces or gravity, by form-fit positive guidance during the opening and closing movement of the gate leaf/gate curtain, by means of positive guidance of the photoelectric barrier components relative to the leading edge or the gate curtain, i.e. the transmitter unit and/or the receiver unit and/or the transmitter/receiver unit and/or the reflector unit of the photoelectric barrier. This ensures that the aforementioned units are forcibly brought into their respective operating position by the upward and/or downward movement of the gate leaf by the coupling the units to the gate leaf, so that there is no movement of the units relative to the gate leaf independent of the position of the gate leaf. Moreover, the form-fit positive guidance system according to the invention can only fail if a mechanical breakage or a violent bending of one of the links providing the positive guidance takes place.

The term "lower end region"/"lower end region of the gate leaf travel path" is to be understood as a region at a vertical height in which, in accordance with relevant safety regulations, e.g. the DIN EN 12453:2017 or other relevant accident prevention rules and regulations to ensure safe operation is possible and allowed to reduce the effective distance D between the photoelectric barrier and the leading edge of the gate leaf, if the leading edge of the gate leaf is within this range. Such a region depends in terms of its vertical extension, for example, on the gate leaf speed and the possible braking capacity of the gate curtain. Outside this "lower end region"/"lower end region of the gate curtain's travel path", a fixed distance between a leading photoelectric barrier and the leading edge is required in accordance with the above-mentioned safety regulations, which must be present outside the lower end region.

In a particular embodiment of the invention, process-reliable detection of any breakage or bending of members of the positive guidance is achieved by assigning the photoelectric barrier components or their field of view to a "viewing slot" which allows a narrowed field of view only when the photoelectric barrier components are brought into their proper position by means of the positive guidance.

The term "narrowed field of view" means that the geometric design and arrangement of the "viewing slot" is such that a narrower region than the standard, design-related field of view of photoelectric barrier sensors or corresponding light-emitting units is used to monitor the gate function. If one of the photoelectric barrier components (light emitting unit or light receiving unit or light emitting/light receiving unit or reflector unit) leaves this region narrowed by the viewing slot, a malfunction is detected and an error message is sent to the corresponding control system of the gate. Compared with the use of the corresponding photoelectric barrier components in their standard state, this therefore realizes a narrower positioning tolerance of the components in relation to each other during operation of the lifting gate, and thus increased safety requirements.

According to a particular embodiment, at least one of the transmitting unit, the receiving unit, the transmitting/receiving unit and/or the reflector unit, preferably all units, is/are arranged within a frame body of frames.

With this embodiment, it is possible on the one hand to protect the photoelectric barrier components, i.e. a transmitter unit, a receiver unit, a transmitter/receiver unit or a reflector unit for reflecting emitted light from the transmitter unit to the receiver unit, particularly well from soiling and also to ensure that a mechanism which supports the photoelectric barrier components is protected from direct influence by objects and/or persons inside the gate opening of the lifting gate.

According to another embodiment, the gate leaf is a windable gate curtain or a sectional gate leaf formed of rigid sections.

The invention is suitable for lifting gates in general, and in particular for high-speed lifting gates, which according to the invention are regarded as high-speed lifting gates if maximum speeds of the gate leaf are above 2.5 m/s.

Such gates can be equipped with a windable, flexible gate curtain, for example made of foil or the like as a gate leaf, or for example as a sectional gate with rigid sections assembled to form a sectional gate leaf.

It is particularly preferred that a guide gap in which a guide carriage is provided for at least one photoelectric barrier component (transmitter unit/receiver unit/reflector unit/transmitter/receiver unit) is arranged inside the frame body is arranged inside the frame body.

Frames of the lifting gate are formed by frame bodies, in particular hollow bodies, in which guide members for the gate leaf are arranged. The frame body also has a guide gap in which a guide carriage is displaceably provided, which is coupled to at least one photoelectric barrier component that can be moved up and down. Such a design enables the gate leaf to be moved within the frame body, i.e. protected from external influences with regard to the photoelectric barrier component. A guide gap is particularly suitable for synchronous guidance of the guide carriage relative to the gate leaf. The guide gap can be a gap in the frame body that is also penetrated by the gate leaf.

In particular, it is advantageous that the guide carriage is coupled to the gate leaf by means of a coupling member which is supported in a jointed manner at one end with respect to the guide carriage and at the other end with respect to the gate leaf.

The guide carriage is preferably coupled to the gate leaf by the double-jointed coupling member, so that by shifting the jointed associations of the guide carriage and the coupling member relative to the gate leaf, it is possible to reduce the distance D in the vicinity of the floor, i.e., when a free leading edge of the gate closure approaches the floor.

In a preferred embodiment, a joint axis G of the coupling member is arranged offset from the guide gap of the guide carriage with respect to the gate leaf in a direction perpendicular to a gate leaf plane TE, and a first axis of rotation D1, about which the coupling member is rotatably movable relative to the guide carriage, is arranged within the guide gap of the guide carriage.

Due to the offset arrangement of the joint axis G and the rotational axis D2 of the coupling member relative to each other, a force component is exerted on the guide carriage, starting from the gate leaf, in the horizontal direction, which enables the guide pins (which will be described further below) to rest clearly on a boundary edge of the guide gap. This avoids fluttering or vibrating guiding, both in pull mode (i.e., when the gate is being opened) and in push mode (i.e., when the gate is being closed), so that the photoelectric components can be guided cleanly, accurately and smoothly.

If the function is impaired, e.g. due to mechanical damage, this situation can be reliably detected and the system immediately put out of operation. Preferably, a first guide pin B1 of the guide carriage and a second guide pin B2 of the guide carriage are arranged within the guide gap, and a center axis of the first guide pin B1 coincides with the joint axis G.

This design allows a particularly simple configuration of the mechanics supporting the photoelectric barrier components.

In another advantageous embodiment, photoelectric barrier components of the photoelectric barrier are arranged below the second guide pin B2 on the guide carriage, as seen in the vertical direction of the lifting gate.

This arrangement creates a theoretical pivoting lever arm between a photoelectric barrier component and a central axis (axis of rotation D2) of the guide pin B2, so that when the guide carriage pivots, the photoelectric barrier component is moved in a horizontal direction component with respect to the guide gap. This is particularly advantageous in that, in the event of a guide pin breakage or other defect, this results in a displacement of the photoelectric barrier component behind a boundary edge of the guide gap and thus the function of the photoelectric barrier is disturbed, which can be easily detected and used as a triggering parameter for an emergency shutdown of the gate.

In a particularly preferred manner, the guide gap has an unthreading opening for the first guide pin B1 at a predetermined distance from the lower end position of the gate leaf so that it can be unthreaded from the guide gap.

The unthreading opening is used for selective unthreading and rethreading of the first guide pin B1 from the guide gap at the lower end of the travel path of the gate leaf. This produces a pivoting movement of the guide carriage around the guide pin B2, which reduces the vertical distance D in interaction with the jointed coupling member, only when the gate curtain approaches the floor. This results in a targeted "buckling" of the mechanics supporting the photoelectric barrier components.

In a further particularly preferred embodiment, a guide rail which guides the guide carriage in the unthreaded state of the second guide pin B2 is associated with the unthreading opening.

This measure is particularly useful for defined and precise guiding of the guide carriage in the case of the unthreaded guide pin B1.

It is expedient that the second guide pin B2 is assigned to a guide roller in the vertically lower end region of the guide carriage, which prevents the second guide pin B2 from unthreading from the guide gap.

When the gate curtain is operated, the guide pin B2, which is further down in the vertical direction, arrives first at the unthreading opening. However, the B2 guide pin must not penetrate the unthreading opening under any circumstances—not even unintentionally. This is reliably prevented by the guide roller.

In a further preferred example, the coupling member includes an obtuse angle $\alpha$ with the vertical in a side view, i.e., in a direction of view in the plane of the gate leaf toward the safety device.

By providing an obtuse angle $\alpha$ in the manner described above, it is possible to ensure a directionally unambiguous buckling of the mechanism and thus to guide the guide pin B2 through the unthreading opening in a targeted manner.

In particular, the joint axis G of the coupling member is preferably arranged offset by an offset V from the guide gap in a side view of the safety device.

Such an offset V also serves to ensure an unambiguous buckling direction in the event of the guide carriage resting on a vertically lower stop (floor or separate mechanical stop).

In another advantageous embodiment, the coupling member is connected to a blade of the gate leaf or directly to the gate leaf via a connecting bracket, with the blade or a sealing rubber forming a leading edge of the gate leaf.

It is expedient that the coupling member is connected to a blade of the gate closing body via a connecting bracket. This greatly facilitates the assembly. Alternatively, however, it can also be connected directly to a gate leaf. This is expedient because in this case no jointed connection is possible between the connecting bracket and the gate leaf, but a fixed (rigid) connection, which is easier to realize for reliable continuous operation.

Advantageously, the guide gap has a recess which allows light beams of the photoelectric barrier to penetrate freely even in the unthreaded state of the guide carriage.

In the case of a planned, intentional unthreading in the bottom region of the gate curtain, during the reduction of the distance D, which in its advantageous embodiment of the invention, the photoelectric barrier should move closer and closer to the gate curtain in relative terms, while being still fully functional at the same time. Since—as described above—in the case of unthreading of the guide carriage the photoelectric barrier experiences a horizontal guide component, it is expedient to provide such a recess so that the function of the photoelectric barrier is also ensured in this operating range.

In particular, in the unthreaded state of the guide carriage, the light beams of the photoelectric barrier penetrate the guide gap.

The design is particularly simple in that the guide gap of the guide carriage is also used for the passage of light beams of the photoelectric barrier.

Particularly advantageously, the guide gap is arranged in a guide cheek, which is located inside the frame body.

A guide cheek, which can be formed for example as a sheet metal bending part, is particularly preferably arranged inside the frame body, whereby both the photoelectric barrier components and the actuating mechanism comprising at least the coupling member and the guide carriage as well as the stationary guide members (guide gap and unthreading opening) are accommodated in a protected manner.

In a further preferred embodiment, during an upward movement from the lower end position of the gate leaf, the coupling member acts as a tensile member and pulls the guide carriage along the guide rail and into the guide gap, passing through the unthreading opening.

In the event of an upward movement of the gate leaf, the coupling member acts as a tensile member and can thus move the guide carriage from an unthreaded to a threaded operating position by applying tensile forces in a particularly vibration-free and precisely guided manner.

In a further preferred example, at least one of the photoelectric barrier components is associated with a pivot body rotatable about a vertical axis disposed within the frame body.

The specified alternative uses the upward and downward movement of the gate leaf in the region near the floor to rotate a pivoting body about a vertical axis by means of a connecting link, whereby the pivoting body supports the photoelectric barrier and the photoelectric barrier pivots away from its effective range.

It is expedient that a pivoting shaft is associated with the pivoting body, which, in the event of the pivoting body touching down on a hall floor, moves vertically in a connecting link and is rotated about the vertical axis by means of the connecting link, so that the photoelectric barrier is pivoted away from the plane of the gate leaf.

According to a second aspect of the invention, a lifting gate comprises a safety device according to one or more of the preceding claims.

BRIEF DESCRIPTION OF THE DRAWINGS

The invention is subsequently explained in more detail by way of example with reference to the FIGS. They show.

DETAILED DESCRIPTION OF EMBODIMENTS OF THE INVENTION

Figure 1:
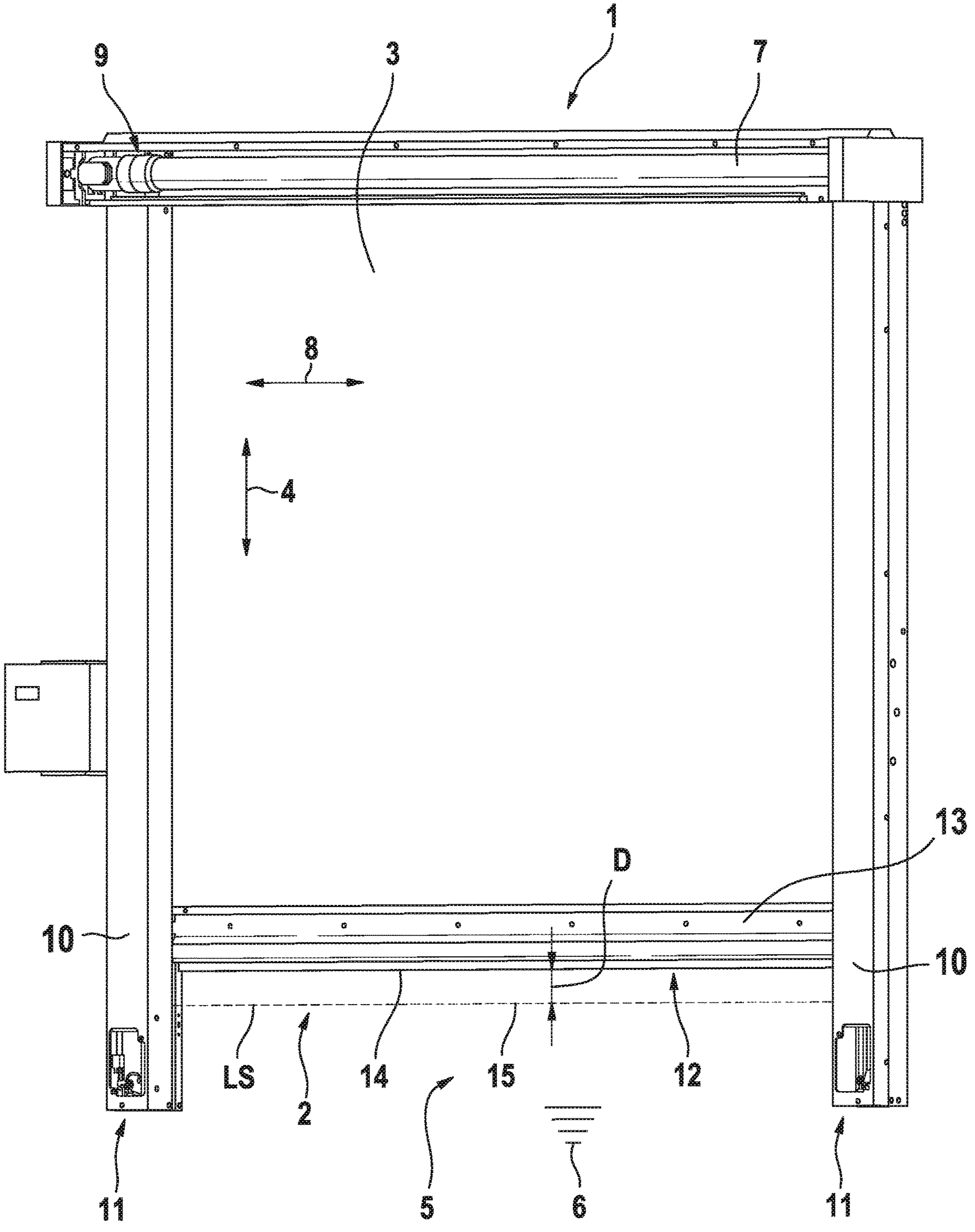
FIG. 1: a perspective view of a lifting gate according to the invention, comprising the safety device according to the invention.

FIG. 1 is a perspective overview of a lifting gate 1 according to the invention with a safety device 2 according to the invention. The lifting gate 1 has as gate leaf 3 a windable gate curtain movable up and down in a vertical direction 4 in a motor-driven manner.

The gate leaf 3 is used to open and close a gate opening 5. The gate opening 5 is bounded vertically below by a hall floor 6. Vertically above, i.e. at the vertically upper edge of the gate opening, a gate curtain winding 7 is arranged, which has a winding axis extending in a horizontal direction 8, around which the gate curtain can be wound up for the purpose of opening and unwound for the purpose of closing the gate opening 5 by means of a winding/unwinding unit 9.

In the horizontal direction 8, the gate opening 5 is limited by frames 10, which are designed as hollow frames. The frames thus have a frame body 11, which has an interior space for accommodating equipment. For example, guide rails (not shown) are mounted in the frame body 11 for lateral guidance of the gate leaf 3.

The gate leaf 3 has a reinforcement at a free leading edge 12, which is referred to below as "blade 13". In contrast to the flexible windable material of the gate curtain, the blade 13 is made of a rigid material and preferably has a sealing lip, e.g. a sealing rubber 14, forming the free leading edge 12 vertically below.

The safety device 2 according to the invention is formed by a photoelectric barrier LS, which is arranged at a vertical distance D below the free leading edge 12. The distance D is selected with regard to its size in such a way that in the event of an interruption of the photoelectric barrier LS, for example by a disturbing object or a person, the downward movement of the gate leaf 3 can be stopped or reversed in its direction of movement before contact with the disturbing object/person.

Over almost the entire travel path of the free leading edge 12 and thus also of the gate leaf 3, the photoelectric barrier LS or its light beam 15 has the distance D to the leading edge 12. In accordance with applicable safety requirements, the distance D may be reduced if the free leading edge 12 is located near the floor. Corresponding requirements are specified in DIN EN 12453. Below the distances specified there, the photoelectric barrier LS must still function as a safety device 2, but may have a smaller distance D to the free leading edge 12. This is also necessary because the photoelectric barrier LS or its light beam 15 cannot sink into the hall floor 6 in a sensible manner.

The photoelectric barrier LS has a transmitter unit, a receiver unit (not shown) and a reflector unit (not shown) opposite the transmitter unit with respect to the gate opening for transmitting the light beam 5. The transmitter unit and the receiver unit (not shown) can be combined to form a combined transmitter/receiver unit.

With regard to the design of the individual photoelectric barrier components 17, the skilled person can draw on a large number of components from the prior art.

In the following, the generic term "photoelectric barrier component 17" is used for the transmitter unit, the receiver unit (not shown), the reflector unit (not shown) and, if applicable, the transmitter/receiver unit, which is used as a proxy for the individual components mentioned above.

In the following, a structure and a mode of operation of an actuating mechanism for a safety device according to the invention are described with reference to FIGS. 2 to 4 in a first embodiment.

Figure 3:
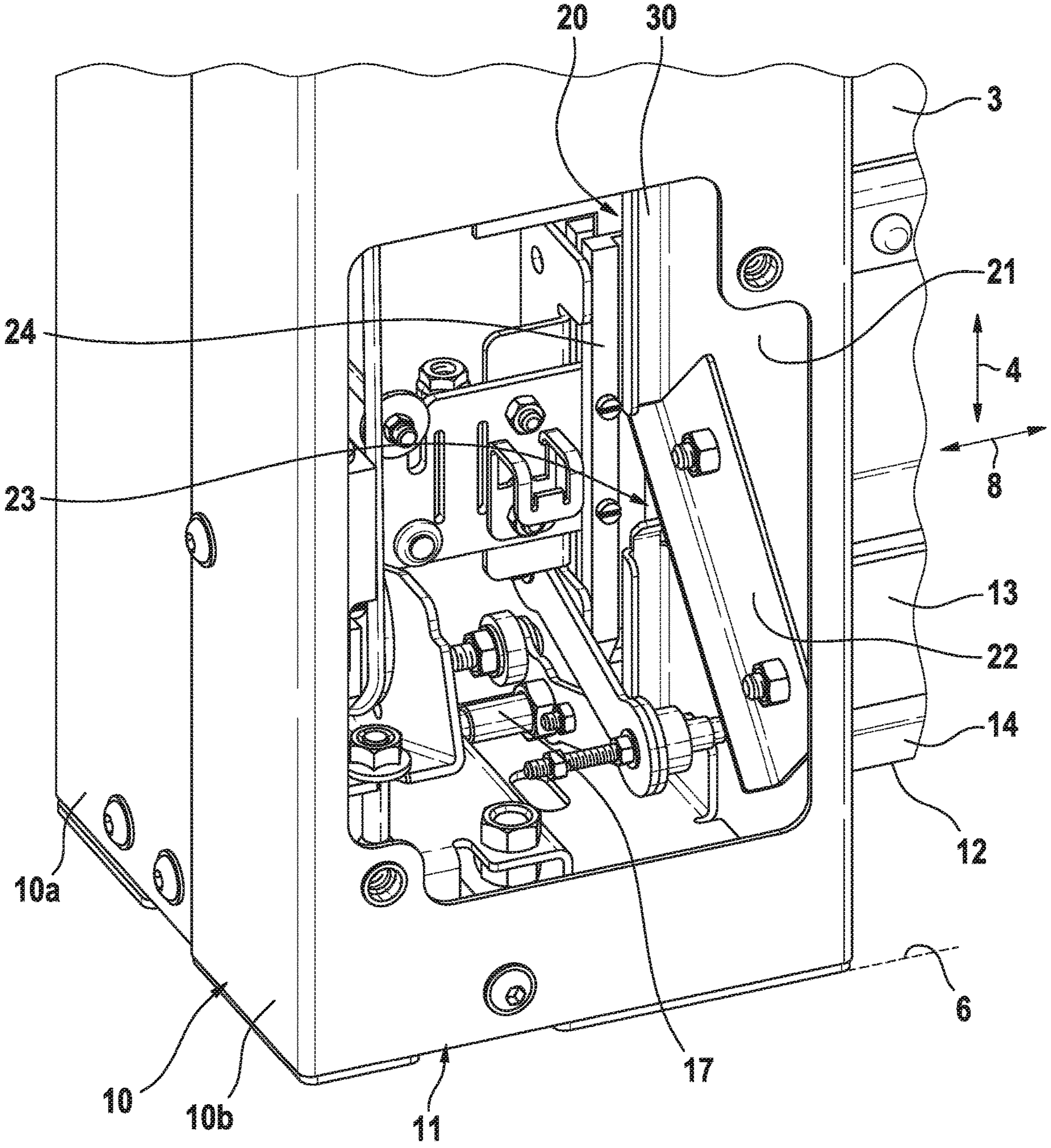
FIG. 3: a perspective view into the interior of a frame body (through a maintenance opening) in a state where the safety device is in an unthreaded state (gate leaf fully lowered)
Figure 4:
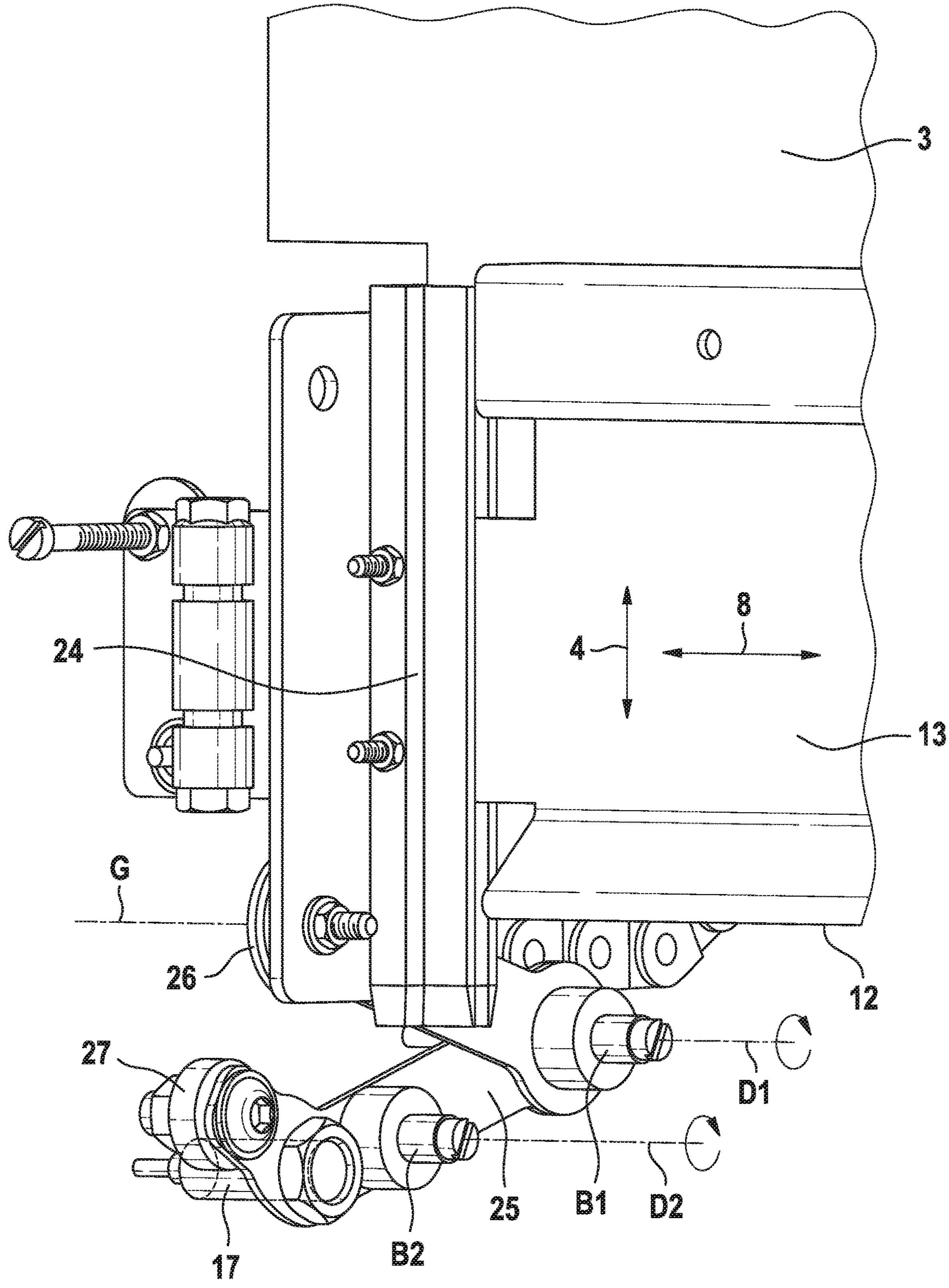
FIG. 4: a perspective view of a portion of the safety device.
Figure 5:
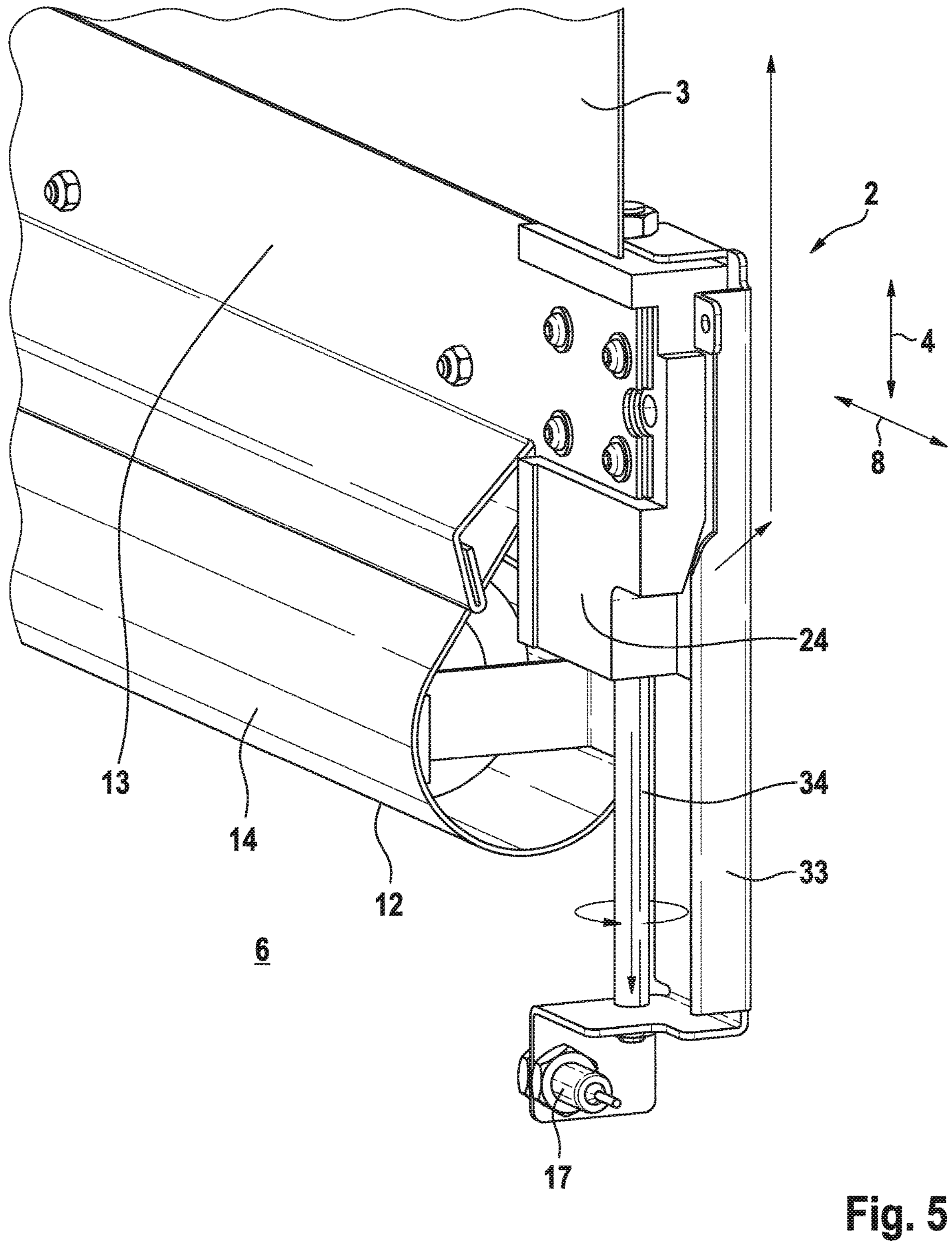
FIG. 5: a perspective view of an alternative embodiment of the safety device according to the invention.

First of all, reference is made to FIG. 3, which shows a bottom region of a frame 10 with the cover of a maintenance opening removed so that its inner workings are visible. The frame 10 has a frame main cheek 10*a* and a frame cover cheek 10*b*. The frame main cheek 10*a* and the frame cover cheek 10*b* are formed, for example, as a sheet metal forming part and have a substantially U-shaped spatial shape in cross section. They extend along the vertical direction 4.

The frame main cheek 10*a* and the frame cover cheek 10*b* form the frame body 10, which is hollow on the inside. The frame body 10 has a guide gap 20 through which the gate leaf 3 passes. The guide gap 20 is formed, for example, from side walls of the frame main cheek 10*a* and the frame cover cheek 10*b*, thus forming a guide cheek 21.

The following components are also arranged in the interior of the frame body 11: a guide rail 22, the upper end of which corresponds to a vertically upper end of an unthreading opening 23. Furthermore, a connecting bracket 24 extends in the guide gap 20. An actuating mechanism is connected to the connecting bracket 24. The connecting bracket 24 is connected, for example, in a clamping manner to the blade 13 of the gate leaf 3 (see FIG. 4). Furthermore, a guide carriage 25 is arranged within the frame body 11, which supports at least one of the photoelectric barrier components 17. At its end facing the connecting bracket 24, the guide carriage 25 is connected to a coupling member 26 so as to be rotatable about an axis of rotation D1. The coupling member 26 is connected at the other end in a jointed manner to a vertically lower end of the connecting bracket 24. The associated joint axis G extends parallel to the plane of the gate leaf 3, as does the first axis of rotation D1.

A first guide pin B1 is also concentrically assigned to the first axis of rotation D1. The first guide pin B1 is set up in such a way that it can extend in the guide gap 20. The guide pin B1 can also be designed as a guide roller that is capable of rolling on boundary edges of the guide gap 20.

Spaced at a distance from the first axis of rotation D1, the guide carriage 25 has a further axis of rotation D2, about which a second guide pin B2, which can also be designed as a second guide roller, can rotate corresponding to the first guide roller.

The second guide pin B2 is also arranged to extend in the guide gap 20.

Opposite the second guide pin B2 and still slightly further away from the first guide pin B1, the guide carriage 25 supports one of the alternator components 17.

Offset from a connecting line of the axes of rotation D1, D2, a guide roller 27, the task of which will be described further below, is seated at a free end of the guide carriage 25.

With regard to the arrangement described above, reference is made to FIG. 2, which shows a guide cheek 21 for the safety device according to the invention, wherein the guide cheek 21 can either be arranged as an individual part inside the frame body 11 or—as in the present embodiment—is formed by walls of the frame main cheek 10 and the frame cover cheek 10*b*.

Tracks for the guide pins B1, B2 are arranged adjacent to the guide gap 20 and are formed, for example, by a chamfer 30 of the guide cheek 21 (see FIG. 3).

In a region of the guide cheek 21 close to the floor, this chamfer 30 has a recess 28 whose function and mode of operation will be described below.

Figure 2:
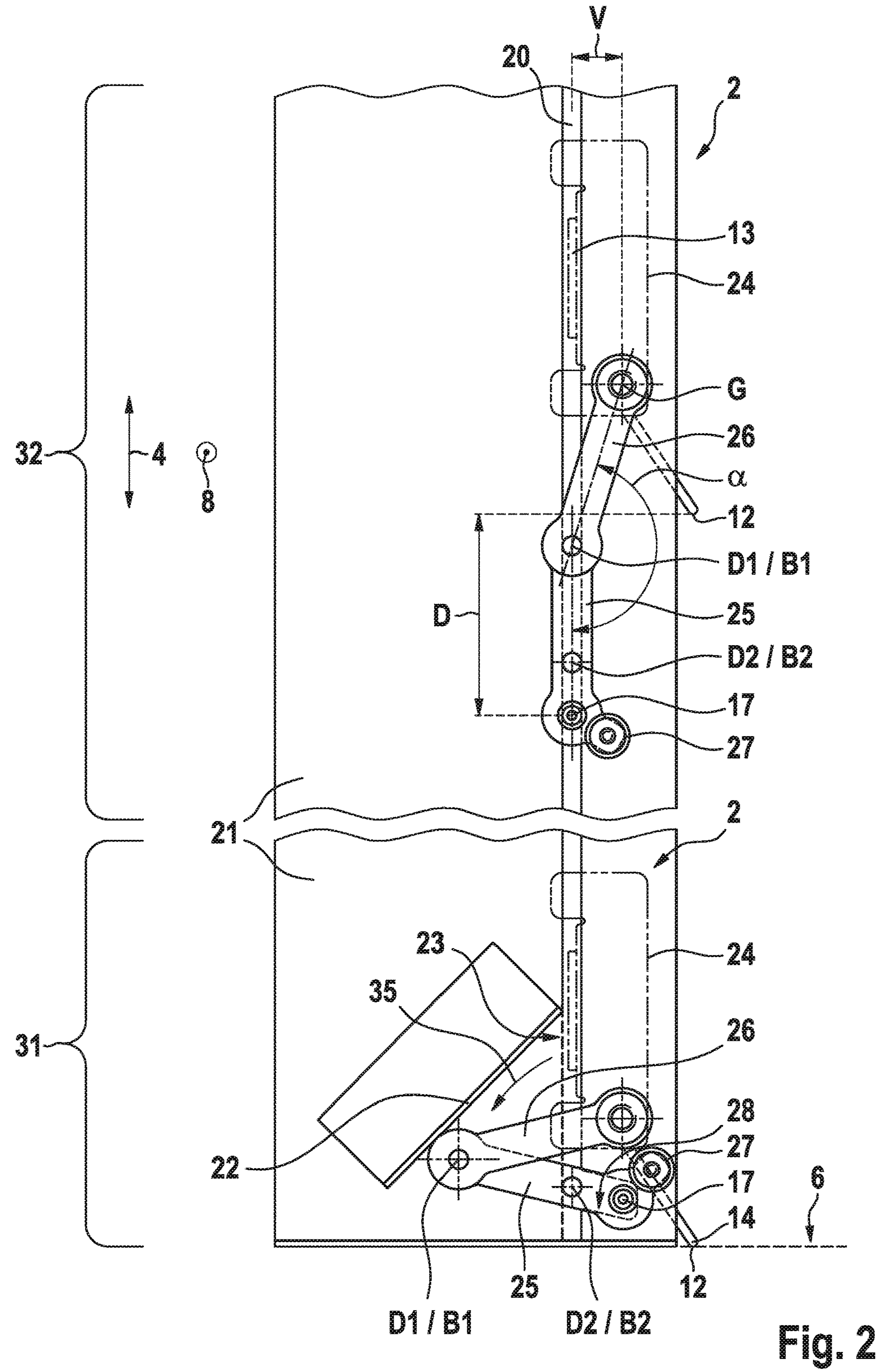
FIG. 2: schematic side view of the safety device according to the invention in a raised position and in a fully lowered position of a gate leaf of the lifting gate.

The illustration according to FIG. 2 shows in an interrupted representation a region 31 close to the floor and a region 32 above the floor region 31. In the region 32, the safety device 2 is shown in a first (stretched) operating position in the illustration according to FIG. 2. In the region 31 close to the floor, the safety device 2 is shown in a compressed (stowed) second operating position, in which the gate leaf 3 is completely lowered. The latter situation is also shown in the illustrations according to FIG. 3 and FIG. 4.

The connecting bracket 24, the coupling member 26, the guide carriage 25 and their above-described interaction with the guide rail 22 or the unthreading opening 23, which takes place by means of the guide pins B1, B2 in the exemplary embodiment, represent an embodiment of a positive guidance according to the invention, in particular form-fit positive guidance.

Due to the suitable arrangement of the photoelectric barrier components 17 with respect to the guide carriage 25 according to the invention, the guide gap 20 on the one hand, which serves to mechanically guide the guide carriage 25, also acts as a viewing slit which the photoelectric barrier components 17 can look through. A width dimension of the guide gap 20 is thereby coordinated in such a way that a narrowed field of view of the photoelectric barrier components 17 compared with the field of view of the photoelectric barrier components 17 due to the design is effective. In addition to a suitable selection of the width of the guide gap 20, a corresponding distance of the photoelectric barrier components 17 from the plane of the guide gap 20 can also ensure a suitable limitation of the field of view.

In the following, the mode of operation of the embodiment described below will be explained in more detail. This is done by way of example with reference to FIGS. 1 to 4, whereby the two essential operating states of the safety device 2 according to the invention are shown in FIG. 2. There, in region 32, a first operating position is shown with the gate leaf 3 being raised. This represents the operating position which is present over the vast majority of the vertical travel path of the gate leaf 3.

In the region 31 close to the floor, a second operating position is shown, which represents an end position that occurs when the gate leaf 3 is in a completely closed position so that the free leading edge 12 rests on the hall floor 6. In other words, the lifting gate is in a closed position in which the gate opening 5 is closed by the gate leaf 3.

In the first operating position shown in region 32, the connecting bracket 24 is located above the coupling member 26, which in turn is located above the guide carriage 25. The coupling of the guide carriage 25, the coupling member 26 and the connecting bracket 24 is designed in such a way that the coupling member 26 and the guide carriage 25 enclose an obtuse angle α. This is achieved by the fact that the joint axis G is offset by an offset V relative to a center of the guide gap 20 in a side view according to FIG. 2. As explained above, the guide pins B1 and B2 extend in the guide gap 20, each with their axes of rotation D1/D2. In this state, it is clear that the photoelectric barrier component 17 has a distance D from a free leading edge 12, the size of which has at least the minimum dimension required for the specific gate.

During an upward movement in the vertical direction 4, the connecting bracket 24 thus pulls the guide carriage 25, which supports the photoelectric barrier component, upward via the coupling member 26. Due to the angle α, during such an upward movement the first guide pin B1 tends to rest against a right stop edge of the guide gap 20 in the representation according to FIG. 2. The second guide pin B2 also extends in the guide gap 20 and ensures that the photoelectric barrier component 17 can look through the guide gap 20 from the inside of the frame body 11 in the direction of the gate opening 5 without hindrance but preferably with a predetermined adapted field of view.

To ensure precise guidance of the guide carriage 25 in the guide gap 20, the guide roller 27 is provided, which extends along a suitable track, for example in the form of a chamfer 30 (see FIG. 1).

When the gate leaf 3 is lowered, the movement of the corresponding components takes place from top to bottom, so that the guide carriage 25 is pushed downwards by the connecting bracket 24 via the coupling member 26. In this mode of operation, the first guide pin B1 is in contact with an edge of the guide gap 20 on the left side in the view according to FIG. 2 due to a pressure force by the coupling member 26.

If the guide carriage 25 now reaches a predefined stop, which may be the hall floor 6, the pressure force applied by the lowering gate leaf 3 via the coupling member 26 increases. At this point, viewed in the vertical direction, the first guide pin B1 is located in the region of the unthreading opening 23 and can leave the guide gap 20 along the direction of arrow 35. In this case, the guide rail 22 is arranged in such a way that an upper free end of the guide carriage 25 or a lower free end of the coupling member 26 or both can slide off it. Thus, the guide carriage 25 performs a rotational movement around the second guide pin B2 (axis of rotation D2) and tilts to the left in the direction of the arrow 35 in a view according to FIG. 2. As a result, the guide roller 27 is lifted off the chamfer 30 and the photoelectric barrier component 17 can pivot into the recess 28.

The recess 28 is formed in such a way that over the entire pivoting path along the direction of arrow 35, the photoelectric barrier component 17 can look either through the guide gap 20 or, in the further course, through the recess 28.

Thus, the linkage structure consisting of the coupling member 26 and the guide carriage 25 is compressed in the vertical direction so that the gate leaf 3 can completely touch down on the hall floor 6 and the photoelectric barrier is in a lower parking position.

During a subsequent upward movement of the gate leaf 3, the movement sequence is reversed. The connecting bracket 24 is moved vertically upward by its fixed connection to the gate leaf 3. A tensile force is exerted on the guide carriage 25, in particular its first guide pin B1, via the coupling member 26, which moves the first guide pin B1 along the direction of the guide rail 22 towards the unthreading opening 23. The second guide pin B2 remains in the guide gap 20. The photoelectric barrier component 17 is pivoted back into the guide gap 20, causing the structure consisting of coupling member 26 and guide carriage 25 to be stretched. This reverse movement takes place until the first guide pin B1 again rests against the edge of the guide gap 20 on the right side as shown in FIG. 2. In this state, the photoelectric barrier component 17 is again in a position according to the region 32 of FIG. 2. The guide roller 27 is again in contact with the chamfer 30 and guides the guide carriage 20, as described above. In this position, the distance D is restored according to the standard.

The present invention thus concerns a positively guided safety device which can be reduced with respect to the distance D in the floor region and which is constructed in the manner of an advancing photoelectric barrier. At least one of the photoelectric barrier components is preferably guided with a corresponding safety device in each of the frame bodies 11. This is done in such a way that, for example, a transmitter/receiver unit is arranged in one frame body 11, which emits a light beam to a reflector body that is guided in the second, opposite frame body. This makes it possible to detect even a one-sided failure of the safety device 2 (for example in the event of a break), since the absence of a photoelectric barrier component that does not run at the same level as the other would be immediately noticeable.

The angled design (angle α) also ensures that the guide pins B1/B2 are clearly in contact with boundary edges of the guide gap 20, so that reliable unthreading and also rethreading of the first guide pin B1 from or into the guide gap 20 is ensured.

A further advantage of the invention is that, according to a particular embodiment, the entire safety device 2 is accommodated in a frame body of a lifting gate 1 according to the invention and thus the gate opening is completely free of protruding safety devices or safety devices projecting into a gate opening, i.e. without a disturbing curve. This contributes significantly to component safety and to the operational safety of the device.

In a second alternative embodiment of the invention, the safety device 2 is formed with a modified kinematics compared to the first embodiment described above. The connecting bracket 24 is connected to a pivot body 33, the pivot body 33 supporting the photoelectric barrier component 17 at a vertically lower end. The pivoting body 33 is guided via a pivoting shaft 34, which is mounted axially, i.e. displaceably along the longitudinal direction of the pivoting shaft 34 within the connection console 24. The pivoting body 33 is thus also displaceable in the vertical direction relative to the connecting bracket 24 by virtue of its connection to the pivoting shaft 34, and is arranged so as to be rotatable relative to the console 24 about an axis parallel to the vertical direction. The connecting bracket 24 has a link (not shown) on the inside, which interacts with a corresponding actuating member (not shown) of the pivot shaft 34, whereby the link ensures that when the pivot body touches down on a stop inside the frame body 11, a rotation of the pivot body 33 about the pivot axis parallel to the vertical axis takes place as a result of the downward movement of the connecting bracket 24 due to the closing movement of the gate leaf 3.

The invention claimed is:

1. A safety device for a fast-running lifting gate (1), having a gate leaf (3) movable up and down and guided along both lateral gate opening edges, wherein a free leading edge (12) of the gate leaf (3) is assigned, at a distance (D) below the leading edge (12), to a photoelectric barrier (LS) which travels with the movement of the gate leaf (3), wherein the distance (D) can be reduced in a lower end region of a travel path of the gate leaf (3), characterized in that at least a transmitting unit and/or a receiving unit corresponding thereto and/or a transmitting/receiving unit and/or a reflector unit corresponding thereto of the photoelectric barrier (LS) can be moved within the lower end region by means of a mechanical positive guidance towards the leading edge (12) and away from the leading edge (12), whereas the distance (D) outside of the lower end region is fixed unchangeably by means of the positive guidance.

2. The safety device according to claim 1, characterized in that the positive guidance is designed as a form-fit positive guidance.

3. The safety device according to claim 1, characterized in that the gate leaf (3) is guided along gate opening edges on both sides in frames (10).

4. The safety device according to claim 1, characterized in that photoelectric barrier components (17), comprising at least one transmitting unit and/or a receiving unit corresponding thereto and/or a transmitting/receiving unit and/or a reflector unit corresponding thereto, are assigned to a viewing slot, the viewing slot being in particular a guide slot (20) within the frame (10).

5. The safety device according to claim 1, characterized in that the gate leaf (3) is a windable gate curtain or a sectional gate leaf formed of rigid sections.

6. The safety device according to claim 1, characterized in that a guide gap (20), in which a guide carriage (25) for at least one photoelectric barrier component (17) comprising transmitter unit/receiver unit/reflector unit/transmitter/receiver unit, is arranged within a frame body (11).

7. The safety device according to claim 6, characterized in that the guide carriage (25) is coupled to the gate leaf (3) by means of a coupling member (26) which is supported in a jointed manner at one end with respect to the guide carriage (25) and at the other end with respect to the gate leaf (3).

8. The safety device according to claim 7, characterized in that a joint axis (G) of the coupling member (26) is arranged offset from the guide gap (20) of the guide carriage (25) with respect to the gate leaf (3) in a direction perpendicular to a gate leaf plane (TE), and a first axis of rotation (D1) about which the coupling member (26) is rotatably movable relative to the guide carriage (25) is arranged within the guide gap (20) of the guide carriage (25).

9. The safety device according to claim 8, characterized in that a first guide pin (B1) of the guide carriage (25) and a second guide pin (B2) of the guide carriage (25) are arranged within the guide gap (20), and a center axis of the first guide pin (B1) coincides with a center axis of the first rotation axis (D1).

10. The safety device according to claim 9, characterized in that photoelectric barrier components (17) of the photoelectric barrier (LS) are arranged below the second guide pin (B2) on the guide carriage (25), as seen in the vertical direction (4) of the lifting gate (1).

11. The safety device according to claim 9, characterized in that the guide gap (20) has an unthreading opening (23) for the first guide pin (B1) at a predetermined distance from the lower end position of the gate leaf (3), so that the guide pin (B1) can be unthreaded from the guide gap (20).

12. The safety device according to claim 11, characterized in that the unthreading opening (23) is associated with a guide rail (22) which guides the guide carriage (25) in the unthreaded state of the second guide pin (B2).

13. The safety device according to claim 11, characterized in that, during an upward movement from the lower end position of the gate leaf (3), the coupling member (26) acts as a tensile member and pulls the guide carriage (25) along the guide rail (22) and through the unthreading opening (23) into the guide gap (20).

14. The safety device according to claim 9, characterized in that the second guide pin (B2) is assigned to a guide roller (27) in the vertically lower end region of the guide carriage (25), which prevents the second guide pin (B2) from unthreading from the guide gap (20).

15. The safety device according to claim 8, characterized in that the joint axis (G) of the coupling member (26) is arranged offset by an offset (V) from the guide gap (20) in a side view of the safety device (2).

16. The safety device according to claim 7, characterized in that the coupling member (26) includes an obtuse angle ($\alpha$) with the vertical (4) in a direction of view in the plane of the gate leaf (3) toward the safety device (2).

17. The safety device according to claim 7, characterized in that the coupling member (26) is connected to a blade (13) of the gate leaf (3) or directly to the gate leaf (3) via a connecting bracket (24), with the blade (13) or a sealing rubber (14) forming a leading edge (12) of the gate leaf (3).

18. The safety device according to claim 6, characterized in that the guide gap (20) has a recess (28) which allows light beams (15) of the photoelectric barrier (LS) to penetrate freely even in the unthreaded state of the guide carriage (25).

19. The safety device according to claim 6, characterized in that in the unthreaded state of the guide carriage (25) the light beams (15) of the photoelectric barrier (LS) penetrate the guide gap (20).

20. The safety device according to claim 6, characterized in that the guide gap (20) is arranged in a guide cheek (21) which is located inside the frame body (11).

21. The safety device according to claim 6, characterized in that at least one of said photoelectric barrier components (17) is associated with a pivot body (33) rotatable about a vertical axis located within said frame body (11).

22. The safety device according to claim 21, characterized in that the pivoting body (33) is associated with a pivoting shaft (34) which, in the event of the pivoting body (33) touching down on a hall floor (6), moves vertically in a connecting link and is rotated about the vertical axis by means of the connecting link, so that the photoelectric barrier (LS) is pivoted away from the plane of the gate leaf (3).

* * * * *